Aug. 12, 1952     O. R. BRANCO     2,606,519
LAND AND WATER VEHICLE
Filed June 23, 1948     2 SHEETS—SHEET 1
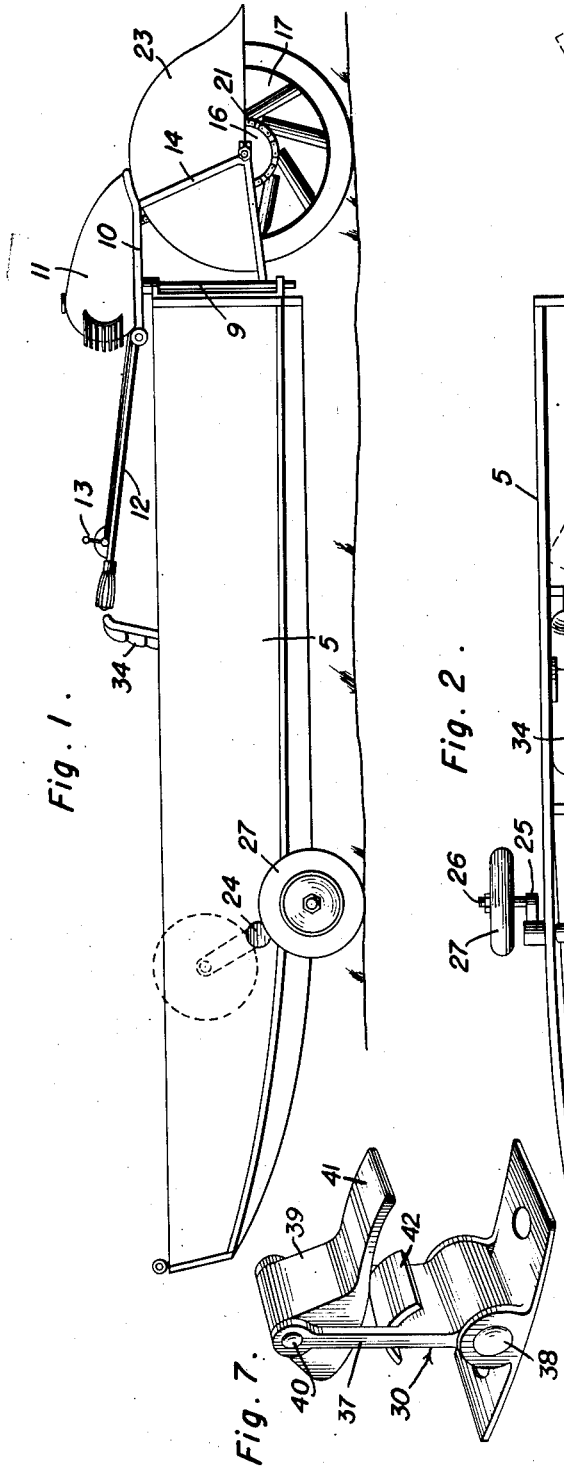
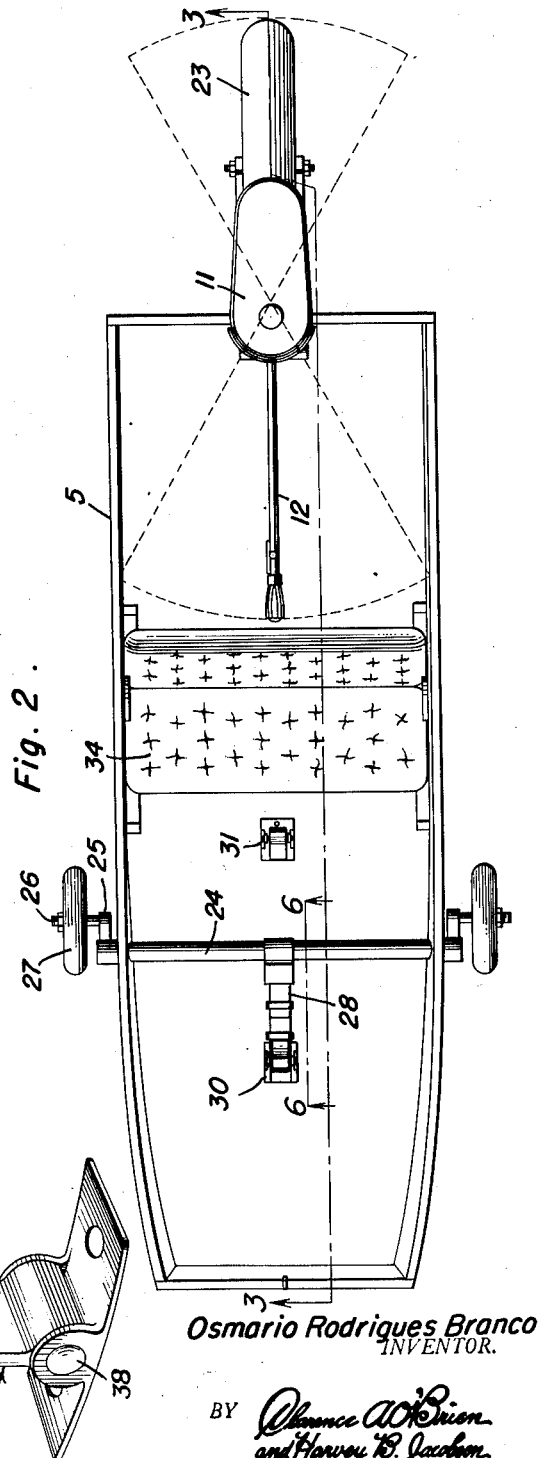
Osmario Rodriques Branco
INVENTOR.
BY Clarence A. O'Brien
and Harvey B. Jacobson
Attorneys Aug. 12, 1952     O. R. BRANCO     2,606,519
LAND AND WATER VEHICLE
Filed June 23, 1948     2 SHEETS—SHEET 2
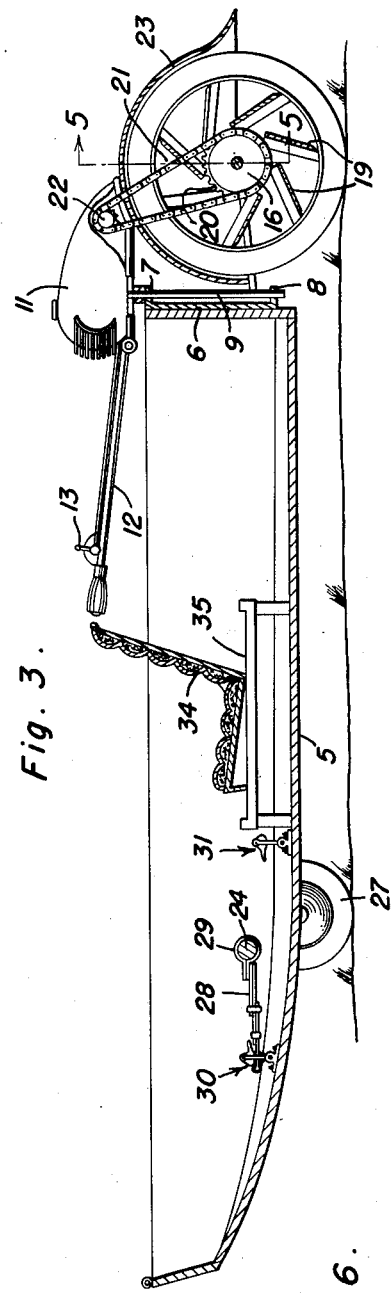
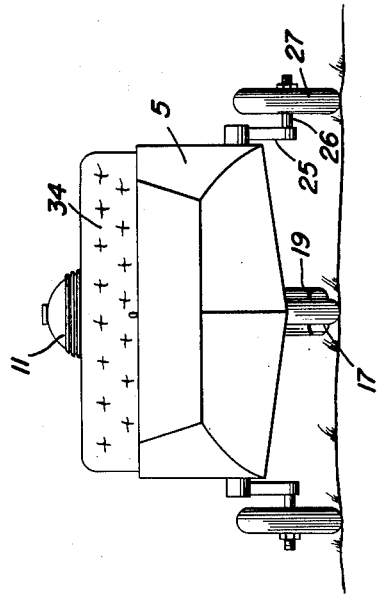
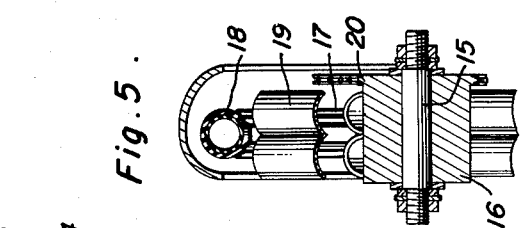
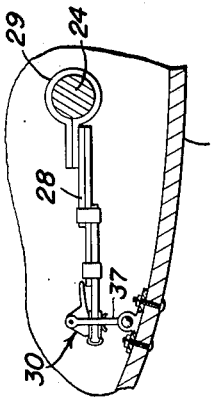
Osmario Rodrigues Branco
INVENTOR.
BY Clarence A. O'Brien
and Harvey B. Jacobson
Attorneys Patented Aug. 12, 1952

2,606,519

UNITED STATES PATENT OFFICE 2,606,519

LAND AND WATER VEHICLE

Osmario Rodrigues Branco, Santos, Brazil

Application June 23, 1948, Serial No. 34,619

2 Claims. (Cl. 115—1)

The present invention relates to new and useful improvements in land and water vehicles for travel either upon land or water and designed to resemble a boat having drive wheels provided with paddles to provide propulsion means for the vehicle when traveling on the water and also to provide drive means for the vehicle when traveling on land.

An important object of the invention is to provide a combined traction and paddle wheel for the vehicle which is also used to steer the same when traveling either on land or water.

A further object of the invention is to provide retractable front wheels for the vehicle with novel means for moving the wheels into and out of retracted position to support the front end of the vehicle when traveling on land and to raise the wheel when traveling on water to prevent interference with the movement of the vehicle.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view;

Figure 2 is a top plan view;

Figure 3 is a longitudinal sectional view taken substantially on a line 3—3 of Figure 2;

Figure 4 is a front elevational view;

Figure 5 is an enlarged fragmentary sectional view of the traction and propelling wheel taken substantially on a line 5—5 of Figure 3;

Figure 6 is an enlarged fragmentary sectional view of the spring suspension means for the front wheels taken substantially on a line 6—6 of Figure 2; and Figure 7 is an enlarged perspective view of one of the spring holding catches.

Referring now to the drawings in detail wherein, for the purpose of illustration, I have disclosed a preferred embodiment of the invention, the numeral 5 designates the body of the vehicle and which is shaped to represent the hull of a boat. A U-shaped bracket 6 is secured in a vertical position to the stern of the boat to provide upper and lower bearings 7 and 8 in which a steering post 9 is journaled. The upper end of the steering post is suitably secured to an engine base 10 on which an internal combustion engine or other suitable power plant 11 is supported, the base 10 and engine 11 being swingable with the steering post by means of a vertically pivoted handle 12 projecting forwardly from the front edge of the base. The handle is provided with a throttle control lever 13 for controlling the speed of the engine.

A wheel supporting frame 14 is rigidly secured to the base 10 and steering post 9 to project rearwardly at the stern of the boat and on which an axle 15 is secured for rotatably supporting the hub 16 of a wheel 17 on the axle. The wheel is preferably equipped with a pneumatic tire 18 for traveling on land and is also provided with paddles 19 which project outwardly at opposite sides of the wheel to provide propulsion means for the vehicle when traveling on water. One end of the hub 16 is formed with a sprocket 20 driven by a chain 21 from the drive shaft 22 of the motor 11. The top of the wheel is provided with a shield or guard 23 and which is suitably secured to the frame 14. A rockable shaft 24 is journaled in the sides of the hull 5 to extend transversely thereof, the outer ends of the shaft being formed with crank arms 25 on which stub axles 26 are carried for a pair of front wheels 27, the wheels being raised and lowered into and out of a retracted position by a rotation of the shaft 24.

A leaf spring 28 is secured to the central portion of shaft 24 by means of a collar 29, the outer end of the leaf spring being selectively engaged under front or rear catches 30 and 31 secured to the inside of the bottom of the boat. The catches 30, 31 each comprise a shackle 37 pivotally mounted at one end thereof, as at 28, to the bottom of the boat 1 to be swung upwardly over the outer end of the leaf spring 28 in straddling hold down relation thereto, or, swung downwardly clear of said end to release said spring 28. The shackles 37 each include a clamping jaw 39 pivoted in the other end thereof, as at 40, with a finger piece 49 thereon for swinging it into and out of clamping relation to a fixed jaw member 42 in the shackle to clamp said end of the leaf spring 28 in the shackle, or release said end for swinging of the shackle 37 into releasing position.

The spring 28 is used as a lever for rocking shaft 24 to raise and lower wheels 27, the spring extending in a forward direction for engagement by front catch 30 when the wheels are lowered to thus provide spring suspension means for the wheels when traveling on land, and the spring being swung rearwardly for raising the wheels into a retracted position and engaged under rear catch 31 when the vehicle travels on water.

A seat 34 is supported on side rails 35 substantially at the center of the hull 5.

In the operation of the device, the wheel 17 is driven by engine 11 to provide a drive wheel for the vehicle when traveling on land and the paddles 19 carried by the wheel provide propulsion means when traveling in water.

The vehicle is steered by swinging the wheel 17 from side to side on rudder post 9.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. An amphibious vehicle comprising a boat hull, a power operated land and water propulsion device at the stern of the hull, a rockable transverse shaft carried by the hull, wheels journaled on the shaft eccentrically to the axis of the shaft, and a combined lever and leaf spring having one end attached to said shaft and a free end for grasping to manually swing said spring into opposite positions to rock said shaft for raising and lowering said wheels, and catches on the bottom of the hull for engaging said free end of said spring to hold the same in either position, said spring when held in one position providing a spring mounting for the wheels.

2. The combination of claim 1 wherein said catches comprise shackles swingable over said free end of said spring.

OSMARIO RODRIGUES BRANCO.

REFERENCES CITED

The following references are of record in the file of this patent:

UNITED STATES PATENTS

| Number | Name | Date |
|---|---|---|
| 693,228 | Brittain | Feb. 11, 1902 |
| 780,835 | Such | Jan. 24, 1905 |
| 2,457,567 | Kuns | Dec. 28, 1948 |

FOREIGN PATENTS

| Number | Country | Date |
|---|---|---|
| 855,949 | France | Mar. 4, 1940 |